(12) United States Patent
Cai

(10) Patent No.: US 9,173,141 B2
(45) Date of Patent: Oct. 27, 2015

(54) METHOD, DEVICE AND SYSTEM FOR ESTABLISHING NEIGHBORING BASE STATION CONNECTIONS

(75) Inventor: Bo Cai, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 192 days.

(21) Appl. No.: 13/484,852

(22) Filed: May 31, 2012

(65) Prior Publication Data

US 2012/0238314 A1    Sep. 20, 2012

Related U.S. Application Data

(63) Continuation of application No. PCT/CN2010/080309, filed on Dec. 27, 2010.

(30) Foreign Application Priority Data

Jan. 28, 2010    (CN) .......................... 2010 1 0104350

(51) Int. Cl.
| | | |
|---|---|---|
| H04W 4/00 | (2009.01) | |
| H04B 7/00 | (2006.01) | |
| H04W 36/00 | (2009.01) | |
| H04W 92/20 | (2009.01) | |

(52) U.S. Cl.
CPC .......... H04W 36/0083 (2013.01); *H04W 92/20* (2013.01)

(58) Field of Classification Search
CPC .................... H04W 36/0061; H04W 36/0077; H04W 76/025; H04W 92/20

USPC .................... 455/432.1, 432.3, 524
See application file for complete search history.

(56) References Cited

U.S. PATENT DOCUMENTS

| | | | |
|---|---|---|---|
| 2009/0109933 A1* | 4/2009 | Murasawa et al. | 370/335 |
| 2009/0201884 A1* | 8/2009 | Chaponniere | 370/332 |
| 2010/0227603 A1* | 9/2010 | Gupta et al. | 455/418 |
| 2011/0164590 A1 | 7/2011 | Wang et al. | |
| 2011/0243097 A1* | 10/2011 | Lindqvist et al. | 370/331 |
| 2011/0281590 A1* | 11/2011 | Frederiksen et al. | 455/449 |

FOREIGN PATENT DOCUMENTS

| | | |
|---|---|---|
| CN | 1791050 A | 6/2006 |
| CN | 1863368 A | 11/2006 |
| CN | 101478739 A | 7/2009 |
| CN | 101605367 A | 12/2009 |

(Continued)

OTHER PUBLICATIONS

Office Action issued in corresponding Chinese Patent Application No. 201010104350.4, mailed Jan. 30, 2013.

(Continued)

*Primary Examiner* — Simon Nguyen
(74) *Attorney, Agent, or Firm* — Brinks Gilson & Lione

(57) ABSTRACT

A method, a device and a system for establishing neighboring base station connections are provided according to the present invention. In the method, access information of a base station on a bearer network is obtained dynamically, neighborhood information of the base station is obtained according to the access information, and a neighboring base station connection is established according to the access information and the neighborhood information of the base station.

11 Claims, 3 Drawing Sheets

(56) References Cited

FOREIGN PATENT DOCUMENTS

| CN | 101621782 A | 1/2010 |
|---|---|---|
| EP | 1357766 A1 | 10/2003 |
| EP | 1983772 A1 | 10/2008 |
| WO | WO 2009/019319 A2 | 2/2009 |
| WO | WO 2009/096835 A1 | 8/2009 |
| WO | WO 2009/120127 A1 | 10/2009 |

OTHER PUBLICATIONS

PCT Written Opinion of the International Searching Authority mailed Apr. 7, 2011, issued in related International Application No. PCT/CN2010/080309, Huawei Technologies Co., Ltd. (5 pages).

EPO Extended European Search Report mailed Aug. 3, 2012, issued in related European Application No. 10844473.8, Huawei Technologies Co., Ltd. (12 pages).

3GPP TSG-RAN WG3 Meeting#61bis, Prague, Czechia, Sep. 30-Oct. 3, 2008, R3-082476, Mitsubishi Electric, "HeNBs and X2 Interface", (3 pages).

Office Action issued in corresponding European Patent Application No. 10844473.8, mailed Jul. 25, 2013, 8 pages.

PCT International Search Report mailed Apr. 7, 2011, issued in related International Application No. PCT/CN2010/080309, filed Dec. 27, 2010, Huawei Technologies Co., Ltd. (4 pages).

Da-wei et al., "Analysis on Automatic Neighbor Discovery Mechanism in Automatic Switched Optical Network of User Network Interface", China Academic Journal Electronic Publishing House, Sep. 2006, (3 pages).

Lei et al., "Analysis on Automatic Neighbor Discovery Mechanism in Optical Transport Network", China Academic Journal Electronic Publishing House, Sep. 2004, (7 pages).

\* cited by examiner

METHOD, DEVICE AND SYSTEM FOR ESTABLISHING NEIGHBORING BASE STATION CONNECTIONS

CROSS-REFERENCE TO RELATED APPLICATIONS

This application is a continuation of International Application No. PCT/CN2010/080309, filed on Dec. 27, 2010, which claims priority to Chinese Patent Application No. 201010104350.4, filed on Jan. 28, 2010, both of which are hereby incorporated by reference in their entireties.

FIELD OF THE APPLICATION

The present application relates to the field of communications technologies, and in particular, to a method, a device and a system for establishing neighboring base station connections.

BACKGROUND

In Long Term Evolution (LTE, Long Term Evolution) network architecture, a base station has two types of interfaces: S1 interface and X2 interface, where the S1 interface is configured for connection between a base station and a gateway, and the X2 interface is configured for connection between neighboring base stations on a bearer network. For the convenience of description, a connection between neighboring base stations on a bearer network may be briefly referred to as a neighboring base station connection, also called an X2 connection.

In the LTE stage, as the coverage radius of base stations is smaller than the coverage radius of base stations in conventional network architecture, the density of base stations needs to be increased, and the number of bearer nodes in a corresponding bearer network is also increased. Meanwhile, as all neighboring base stations need to directly communicate with one another, the number of communication connections between neighboring base stations provided on the bearer network will be very large, that is, a very large number of connections need to be established through the X2 interface. An existing technical solution is adopting a static configuration scheme to complete establishment of connections between neighboring base stations on the bearer network. The bearer network needs to obtain a neighborhood relationship of the base stations in advance, and a network management system of the bearer network completes configuration of circuit connections for the bearer network, so as to achieve mutual communication between neighboring base stations. When the static configuration scheme is adopted to establish connections between neighboring base stations, the networking efficiency is low, and the operation and maintenance cost is high.

SUMMARY OF THE INVENTION

Embodiments of the present invention provide a method, a device and a system for establishing neighboring base station connections, which can improve the networking efficiency and reduce the operation and maintenance complexity.

A method for establishing neighboring base station connections includes:

obtaining, by a bearer node, access information of a base station on a bearer network;

obtaining neighborhood information of the base station according to the access information; and establishing a neighboring base station connection according to the access information and the neighborhood information.

A device for establishing neighboring base station connections includes:

an access information obtaining unit, configured to obtain access information of a base station on a bearer network;

a neighborhood information obtaining unit, configured to obtain neighborhood information of the base station according to the access information obtained by the access information obtaining unit; and an establishing unit, configured to establish a neighboring base station connection according to the access information obtained by the access information obtaining unit and the neighborhood information obtained by the neighborhood information obtaining unit.

A system for establishing neighboring base station connections includes: any device for establishing neighboring base station connections provided in the embodiments of the present invention.

In the embodiments of the present invention, access information of a base station on a bearer network is obtained dynamically, neighborhood information of the base station is obtained according to the access information, and a neighboring base station connection is established according to the access information and the neighborhood information of the base station, which does not require much labor, material or time to perform static configuration of neighboring base station connections, so that the networking efficiency can be improved and the operation and maintenance complexity can be reduced, thereby reducing the operation and maintenance cost.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following description merely show some of the embodiments of the present invention, and persons of ordinary skill in the art can obtain other drawings according to the accompanying drawings without creative efforts.

DETAILED DESCRIPTION OF THE EMBODIMENTS

Embodiments of the present invention provide a method, a device and a system for establishing neighboring base station connections. Detailed illustrations are provided below.

Embodiment 1

The present invention will be described from the view of a device for establishing neighboring base station connections, and the device for establishing neighboring base station connections is used as a bearer node in a bearer network.

Figure 1:
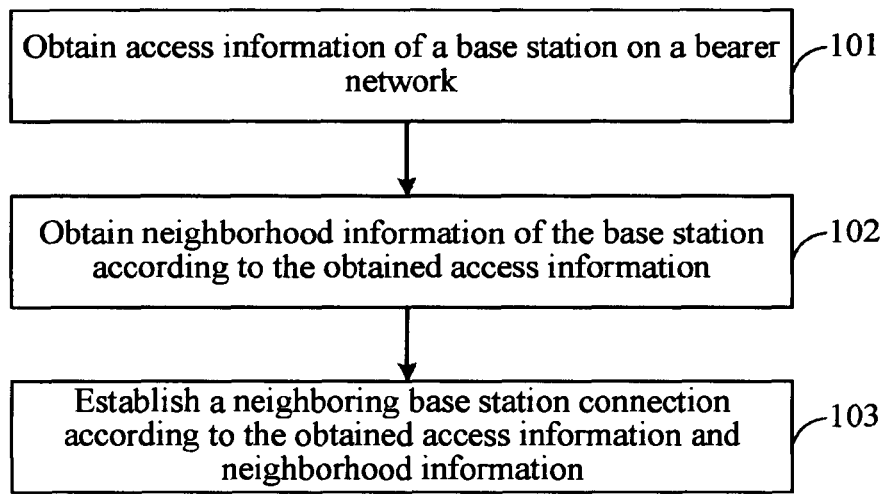
FIG. 1 is a flow chart of a method according to Embodiment 1 of the present invention.

A method for establishing neighboring base station connections includes: obtaining, by a bearer node, access information of a base station on a bearer network, obtaining neighborhood information of the base station according to the obtained access information; and establishing a neighboring base station connection according to the obtained neighborhood information. As shown in FIG. 1, the specific process may be as follows:

101: A bearer node obtains access information of a base station on a bearer network.

The access information may specifically be a connection relation between a base station and a bearer node, and a bearer node may obtain base station identity information of a base station connected to the bearer node, and then save and maintain a connection relation between the base station and the bearer node according to the obtained base station identity information, so as to obtain the access information of the base station on the bearer network.

The bearer node may also obtain all access information of base stations on the bearer network. For example, the bearer node sends the obtained base station identity information to other bearer nodes on the bearer network, receives base station identity information sent by the other bearer nodes on the bearer network, and saves and maintains a connection relation between a base station and a bearer node according to the obtained base station identity information and the received base station identity information. That is, at this time, the bearer node saves connection relations between all base stations and the bearer nodes in the bearer network, that is, obtains access information of all base stations on the bearer network.

In addition to obtaining the base station identity information, the access information of all base stations on the bearer network may also be obtained by obtaining other information that may reflect an access condition of base stations on the bearer network and transferring and spreading the obtained information in the bearer network.

102: The bearer node obtains neighborhood information of the base station according to the obtained access information.

For example, specifically, a communication connection may be established, according to the obtained access information, with the base station connected to the bearer node, and then information exchange may be performed with the base station through the established communication connection to obtain the neighborhood information of the base station.

The bearer node may also obtain neighborhood information of all base stations, for example, the bearer node sends the obtained neighborhood information to other bearer nodes on the bearer network, receives neighborhood information obtained and sent by the other bearer nodes on the bearer network, and saves and maintains the obtained neighborhood information and the received neighborhood information.

To dynamically reflect real-time changes of a network, the neighborhood information may further be updated according to a preset policy, and then neighboring base station connections may be updated according to the updated neighborhood information of the base station. For example, when a base station is added to the network, neighboring base station connections of the base station may be established according to the updated neighborhood information of the base station, and when a base station is removed, all neighboring base station connections related to the removed base station are deleted; while when a base station remains unchanged, and only the neighborhood information of the base station changes, corresponding neighboring base station connection is created or deleted according to the changed neighborhood information. All neighboring base station connections may also be completely updated when the network changes. The neighborhood information may be updated in any one of the following manners:

periodically performing information exchange with the base station to update the neighborhood information of the base station; or receiving the updated neighborhood information of the base station reported by the base station when the neighborhood relationship of the base station changes.

103: The bearer node establishes a neighboring base station connection according to the obtained access information and neighborhood information.

The establishing manner may be any manner in existing technology. For example, a network management device may create a neighboring base station connection, or the bearer node may automatically create a neighboring base station connection, that is, the bearer node initiates a connection establishment request for establishing a connection for neighboring base station to the bearer network according to the obtained access information and neighborhood information, so that the bearer network establishes a neighboring base station connection according to the received connection establishment request.

In a case that the network management device creates a neighboring base station connection, the bearer node may actively report the obtained access information and neighborhood information to the network management device, or send the obtained access information and neighborhood information to the network management device only after receiving a query from the network management device, so that the network management device establishes a neighboring base station connection according to the access information and the neighborhood information.

When a neighboring base station connection is established, if there is a special requirement on the connection, for example, a particular requirement on bandwidth, delay or quality of service (QoS, Quality of Service), a connection attribute may further be preset, so that when a neighboring base station connection needs to be established, the neighboring base station connection may be established according to the obtained access information and neighborhood information on the basis of the preset connection attribute.

As can be known from the above that, in this embodiment, access information of all base stations on a bearer network is obtained dynamically, neighborhood information of the base stations is obtained according to the access information, and neighboring base station connections are established according to the access information and the neighborhood information of the base stations, which does not require much labor, material or time to perform static configuration of neighboring base station connections, so that networking efficiency can be improved, operation and maintenance complexity can be reduced, and operation and maintenance cost can be reduced.

Embodiment 2

According to the method described in Embodiment 1, this embodiment further provides a detail illustration through an example.

A communication protocol interface is added between a bearer node and a base station, so that the bearer node may learn base station identity information of the base station connected to the bearer node, for example, an identity (ID, Identity) of the base station or an Internet Protocol (IP, Internet Protocol) address of the base station, and subsequently may also obtain neighborhood information of the base station through the communication protocol interface; for the specific manner of obtaining the base station identity information, different solutions may be adopted according to different network technologies and connection manners, and the base station identity information may not necessarily be obtained through an added communication protocol interface, and for example, may be obtained by intercepting or monitoring an IP address of a base station accessed.

After obtaining the base station identity information of the base station connected to the bearer node, the bearer node transfers and spreads the obtained base station identity information in the bearer network to other bearer nodes, and meanwhile receives base station identity information transferred from the other bearer nodes in the bearer network, and saves and maintains a connection relation between a base station and a bearer node according to the base station identity information obtained by itself and the received base station identity information transferred from the other bearer nodes. Based on this, the bearer node may learn the connection relations between all base stations connected to the bearer network and all bearer nodes, that is, the bearer node may obtain the access information of all base stations on the bearer network.

After obtaining the access information of all base stations on the bearer network, the bearer node may obtain neighborhood information of the base stations according to the access information, for example, the bearer node may establish a communication connection with the base station according to the access information, and then perform information exchange with the base station through the established communication connection to obtain neighborhood information of the base station, and save the neighborhood information. To adapt to dynamic changes of a base station network, the bearer node may periodically perform information exchange with the base station to update the saved neighborhood information, or the base station may send the neighborhood information of the base station to the bearer node in an event triggered manner according to changes of the neighborhood relationship of the base station. The base station needs to save neighborhood information between base stations, where the neighborhood information may be determined on the basis of network planning and deployment, and the determined neighborhood information may be manually configured and saved on each base station, or the neighborhood information of the base station may be discovered dynamically by the base station through an automatic neighbor discovery protocol, and then saved and maintained on the base station.

After obtaining the neighborhood information of the base stations, the bearer node transfers and spreads the neighborhood information in the bearer network, and meanwhile receives neighborhood information of base stations transferred from other bearer nodes in the bearer network (that is, the neighborhood information of the base station obtained by other bearer nodes), and saves and maintains the neighborhood information (including the neighborhood information of the base station obtained by itself, and the neighborhood information of the base stations obtained from other bearer nodes). Based on this, all bearer nodes in the bearer network each save a table of neighboring base station information of all base stations connected to the bearer network.

For example, it is assumed that an IP address of a base station 1 is "10.0.0.1", an IP address of a base station 2 is "10.0.0.2", an IP address of a base station 3 is "10.0.0.3", an IP address of a base station 4 is "10.0.0.4", and an IP address of a base station 5 is "10.0.0.5"; neighboring base stations of the base station 1 are the base station 2, the base station 3, the base station 4 and the base station 5; neighboring base stations of the base station 2 are the base station 1, the base station 3, the base station 4 and the base station 5; neighboring base stations of the base station 3 are the base station 1, the base station 2, the base station 4 and the base station 5; neighboring base stations of the base station 4 are the base station 1, the base station 2, the base station 3 and the base station 5; neighboring base stations of the base station 5 are the base station 1, the base station 2, the base station 3 and the base station 4; in this case, the table of neighboring base station information of base stations that is saved on each bearer node may be shown in Table 1:

TABLE 1

| Local Base Station | Neighboring Base Station | | | | |
|---|---|---|---|---|---|
| 10.0.0.1 | 10.0.0.2 | 10.0.0.3 | 10.0.0.4 | 10.0.0.5 | ... |
| 10.0.0.2 | 10.0.0.1 | 10.0.0.3 | 10.0.0.4 | 10.0.0.5 | ... |
| 10.0.0.3 | 10.0.0.1 | 10.0.0.2 | 10.0.0.4 | 10.0.0.5 | ... |
| 10.0.0.4 | 10.0.0.1 | 10.0.0.2 | 10.0.0.3 | 10.0.0.5 | ... |
| 10.0.0.5 | 10.0.0.1 | 10.0.0.2 | 10.0.0.3 | 10.0.0.4 | ... |
| ... | ... | ... | ... | ... | ... |

As the bearer node has the neighborhood relationship of the base station and the access information of the base station on the bearer network, the bearer network may adopt a corresponding control protocol such as Generalized Multiprotocol Label Switching (GMPLS, Generalized Multiprotocol Label Switching) to establish neighboring base station connections, that is, X2 connections, and then may dynamically manage the neighboring base station connections according to changes of the neighborhood relationship of the base station, for example, when a base station is added to the network, neighboring base station connections of the base station may be established according to the updated neighborhood information of the base station, and when a base station is removed, all neighboring base station connections related to the removed base station are deleted; while when a base station remains unchanged, and only the neighborhood information of the base station changes, corresponding neighboring base station connection is created or deleted according to the changed neighborhood information. All the neighboring base station connections may also be completely updated when a network changes. By dynamically managing the neighboring base station connections, dynamic establishment and maintenance of the neighboring base station connections may be achieved, thereby improving networking efficiency and reducing operation and maintenance cost.

A specific example is provided for detailed description.

Figure 2:
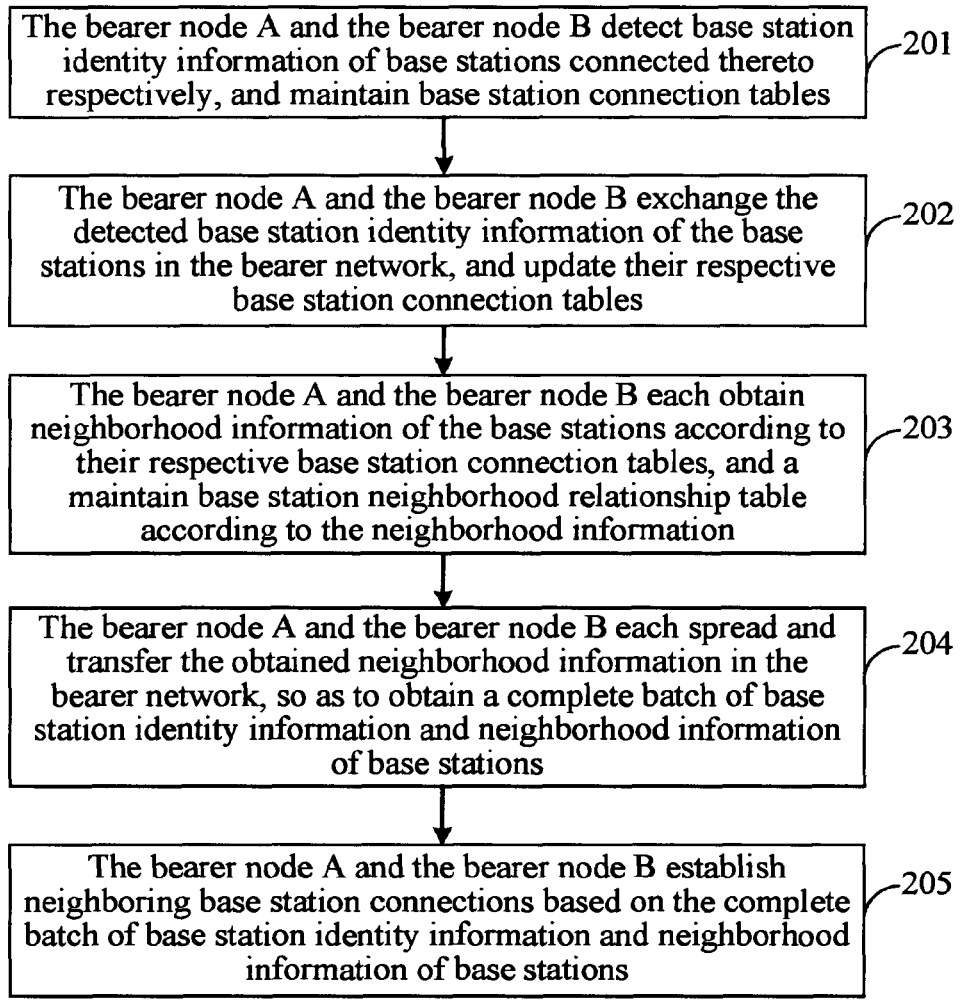
FIG. 2 is a flow chart of a method according to Embodiment 2 of the present invention.
Figure 3:
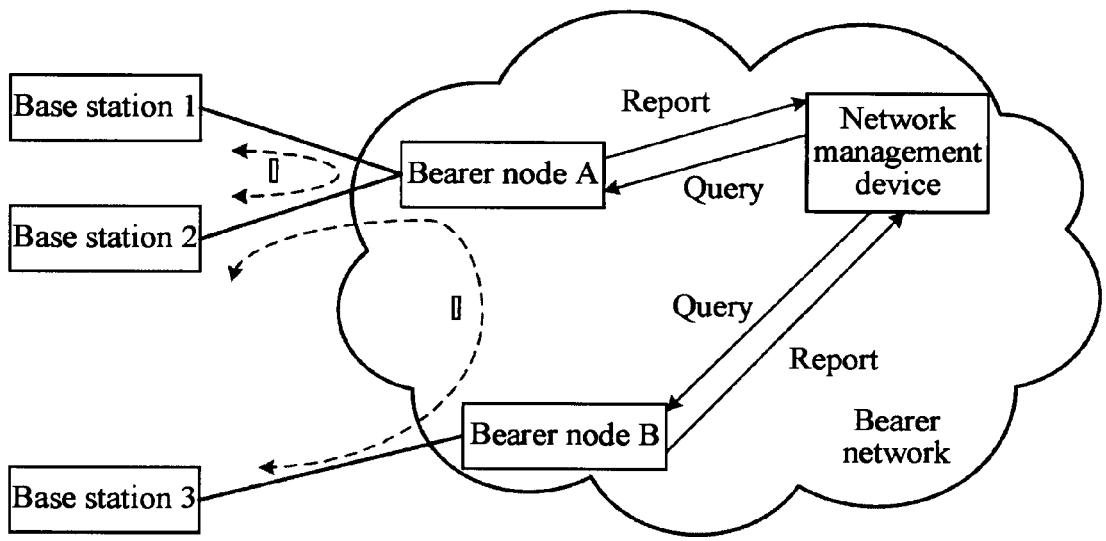
FIG. 3 is a schematic diagram of a network scenario according to an embodiment of the present invention.

Referring to FIG. 3, it is assumed that a bearer network has a bearer node A and a bearer node B, a base station 1 and a base station 2 are connected to the bearer node A, and a base station 3 is connected to the bearer node B, where the base station 1 and the base station 2 are neighbors to each other, and the base station 2 and the base station 3 are neighbors to each other; referring to FIG. 2, the specific process of the method for establishing neighboring base station connections may be as follows:

201: The bearer node A detects base station identity information of base stations connected to the bearer node A and the bearer node B detects base station identity information of base stations connected to the bearer node B, the bearer node A and the bearer node B identify the connected base stations, and the bearer node A and the bearer node B each maintain a base station connection table, where the base station connection table maintained by the bearer node A may be shown in Table 2, and the base station connection table maintained by the bearer node B may be shown in Table 3, as follows:

TABLE 2

| (bearer node A): | | |
|---|---|---|
| Name of Node | Information of Connected Base Stations | |
| Bearer node A | Base station 1 | Base station 2 |

TABLE 3

| (bearer node B): |  |
|---|---|
| Name of Node | Information of Connected Base Stations |
| Bearer node B | Base station 3 |

202: The bearer node A and the bearer node B exchange the detected base station identity information (for example, IDs or IPs) of the base stations in the bearer network, and update their respective base station connection tables, where the base station connection table of the bearer node A after update may be shown in Table 4, and the base station connection table of the bearer node B after update may be shown in Table 5, as follows:

TABLE 4

| (bearer node A): | | |
|---|---|---|
| Name of Node | Information of Connected Base Stations | |
| Bearer node A | Base station 1 | Base station 2 |
| Bearer node B | Base station 3 | |

TABLE 5

| (bearer node B): | | |
|---|---|---|
| Name of Node | Information of Connected Base Stations | |
| Bearer node B | Base station 3 | |
| Bearer node A | Base station 1 | Base station 2 |

203: The bearer node A and the bearer node B establish communication connections with base stations according to the base station connection tables in step 202, and then each perform information exchange with a base station through the established communication connection to obtain neighborhood information of the base station. Each bearer node may maintain a base station neighborhood relationship table according to the obtained neighborhood information of the base stations. For example, referring to Table 6 and Table 7, Table 6 is the base station neighborhood relationship table maintained by the bearer node A, and Table 7 is the base station neighborhood relationship table maintained by the bearer node B.

TABLE 6

| (bearer node A): | | | |
|---|---|---|---|
| Name of Base Station | Neighboring Base Station | | |
| Base station 1 | Base station 2 | | |
| Base station 2 | Base station 1 | Base station 3 | |
| ... | ... | ... | ... |

TABLE 7

| (bearer node B): | | | |
|---|---|---|---|
| Name of Base Station | Neighboring Base Station | | |
| Base station 3 | Base station 2 | | |
| ... | ... | ... | ... |

204: The bearer node A and the bearer node B each spread and transfer the obtained neighborhood information of the base station in the bearer network, that is, each bearer node sends the neighborhood information of the base station obtained by itself to other bearer nodes, and meanwhile receives neighborhood information of base stations transferred from the other bearer nodes, and each bearer node saves and maintains the neighborhood information of the base station obtained by itself and the neighborhood information of the base stations obtained from the other bearer nodes, so that each bearer node may obtain a complete batch of base station identity information and neighborhood information of base stations. For example, in this embodiment, the bearer node A and the bearer node B may both obtain a table of access and neighborhood information of base stations as shown in Table 8:

TABLE 8

| Bearer Node | Name of Access Base Station | Neighboring Base Station | |
|---|---|---|---|
| Bearer node A | Base station 1 | Base station 2 | |
|  | Base station 2 | Base station 1 | Base station 3 |
| Bearer node B | Base station 3 | Base station 2 | |

205: The bearer node A and the bearer node B establish neighboring base station connections based on the complete batch of base station identity information and neighborhood information of base stations. For example, the bearer node A and the bearer node B establish neighboring base station connections based on the table of base station identity information and neighborhood information of base stations (for example, Table 8). A specific establishing manner may be determined according to policies of operators on the basis of the prior art, and only two of common establishing manners are listed below.

(1) A network management device creates neighboring base station connections:

For example, the bearer node A or the bearer node B may actively report the obtained base station identity information and neighborhood information of the base stations to the network management device of the bearer network, or the bearer node A or the bearer node B may report the obtained base station identity information and neighborhood information of the base stations to the network management device of the bearer network only after the network management device of the bearer network queries A or the bearer node B, so that upon receiving the base station identity information and neighborhood information of the base stations, the network management device can learn bearer connection requirements of neighboring base stations in the bearer network, and then can create connections for neighboring base stations in the bearer network.

Referring to dashed lines in FIG. 3, ① is a bearer connection between the base station 1 and the base station 2, created at the bearer node A; ② is a bearer connection between the base station 2 and the base station 3, created at the bearer node A and the bearer node B.

If a neighboring base station relationship changes, the bearer node A or the bearer node B updates the neighborhood information of the base station in real-time, and then reports the updated neighborhood information of the base station to the network management device, so that the network management device can update neighboring base station connections according to the updated neighborhood information of the base station. For example, when a base station is added to the network, neighboring base station connections of the base station may be established according to the updated neighborhood information of the base station, and when a base station is removed, all neighboring base station connections related to the removed base station are deleted; while when the base station remains unchanged, and only the neighborhood information of the base station changes, corresponding neighboring base station connections are created or deleted according to the changed neighborhood information. All neighboring base station connections may also be completely updated when the network changes.

In a scenario of bearing for an LTE network, as an X2 interface is mainly used for information transmission in a process of signal handover between neighboring base stations, the amount of data transmitted is not large; therefore, to simplify the processing, a connection attribute may be set uniformly for neighboring base station connections, for example, uniform bandwidth and/or QoS demands may be set, and then the bearer network management device can create neighboring base station connections according to the preset uniform connection attribute.

If there is a special requirement on neighboring base station connections, for example, a particular requirement on bandwidth, delay, QoS or the like of neighboring base station connections, a connection attribute of a specific neighboring base station connection may also be set separately. Specifically, when the connection attribute is set, setting of the connection attribute may be provided by the base station, or the connection attribute may also be set by the bearer node according to the type of the base station. After the connection attribute is set, the bearer network management device can create neighboring base station connections according to the specific connection attribute, for example, connections with a high requirement on delay may be created according to a shortest path policy; for another example, connections with a high requirement on bandwidth may be created in a manner that can improve the bandwidth utilization ratio, taking the bandwidth utilization ratio of the bearer network mainly into consideration.

(2) A bearer network node creates neighboring base station connections:

If the bearer network supports dynamic control signaling, for example, an Automatically Switching Optical Network (ASON, Automatically Switching Optical Network) supporting Generalized Multiprotocol Label Switching (GMPLS, Generalized Multiprotocol Label Switching) or the like, the bearer node A or the bearer node B may dynamically initiate a connection establishment request for establishing a connection for neighboring base station in the bearer network, and after the bearer network receives the connection establishment request, the bearer network dynamically establishes a neighboring base station connection in the bearer network according to the connection establishment request.

If the neighboring base station relationship changes, the bearer node A or the bearer node B may update the neighborhood information of the base station in real-time, and then initiates a connection establishment request for establishing a connection for neighboring base station according to the updated neighborhood information of the base station, so as to update neighboring base station connections. For example, when a base station is added to the network, neighboring base station connections of the base station may be established according to the updated neighborhood information of the base station, and when a base station is removed, all neighboring base station connections related to the removed base station are deleted; while when a base station remains unchanged, and only the neighborhood information of the base station changes, corresponding neighboring base station connections are created or deleted according to the changed neighborhood information. All the neighboring base station connections may also be completely updated when the network changes.

Similar to the establishing manner (1), to simplify the processing, a connection attribute may be uniformly set for neighboring base station connections, for example, uniform bandwidth and/or QoS demands may be set, and then the bearer network management device can create neighboring base station connections according to the preset uniform connection attribute. However, if there is a special requirement on neighboring base station connections, for example, a particular requirement on bandwidth, delay, QoS or the like of neighboring base station connections, a connection attribute of a neighboring base station connection may be set according to demands when the connection establishment request for establishing a connection for neighboring base station is sent, so as to create a bearer connection corresponding to the set connection attribute.

As can be known from the above that, in this embodiment, the bearer node in the bearer network may obtain the access information of the base stations and the neighborhood information of the base stations, and automatically establish neighboring base station connections according to the obtained access information and neighborhood information of the base stations, so that a large amount of configuration and maintenance work for the network management device in the prior art is greatly reduced, for example, in scenarios such as power off of base stations and relocation or capacity expansion of base stations, new neighboring base station connections can be established without requiring much labor, material or time to reconfigure configuration data. Therefore, the solution provided in the embodiment of the present invention can improve network operation and maintenance efficiency, reduce operation and maintenance complexity and reduce operation and maintenance cost.

Meanwhile, as connections are created by the network automatically, the bearer network may preset a policy corresponding to network resources according to a condition of network resource utilization, and then create links according to the preset policy, so that the utilization ratio of network resources can be sufficiently improved.

Further, as connections are created by the network automatically, problems in the prior art such as communication network failure caused by delayed adjustment of configuration data as manual static configuration is required can be avoided when the network changes, so that the network service quality can be improved.

Embodiment 3

According to the method described in Embodiment 1, this embodiment further provides a detail illustration through an example.

In this embodiment, illustration is provided through an example that a network management device saves a connection situation of an entire network and the network management device initiates establishment of neighboring base station connections. Different from Embodiment 2, in this embodiment, after obtaining access information and neighborhood information of base stations, each bearer node in a bearer network may not spread and transfer the information in a bearer network, that is, each bearer node may not save the connection condition of the entire network, but directly reports the obtained access information and neighborhood information of the base stations to the network management device, so that the network management device performs unified adjustment and control to establish neighboring base station connections.

A communication protocol interface is added between a bearer node and a base station, so that the bearer node may learn base station identity information of the base station connected to the bearer node, for example, an ID or an IP address of the base station, and subsequently may also obtain neighborhood information of the base station through the communication protocol interface; for a specific manner of obtaining the base station identity information, different solutions may be adopted according to different network technologies and connection manners, and the base station identity information may not necessarily be obtained through the added communication protocol interface, and for example, may be obtained by intercepting or monitoring an IP address of an access base station.

After obtaining the base station identity information, the bearer node may obtain neighborhood information of the base station according to the base station identity information, for example, the bearer node may establish a communication connection with the base station according to the base station identity information, and then perform information exchange with the base station through the established communication connection, so as to obtain neighborhood information of the base station, and save the neighborhood information. To adapt to dynamic changes of a base station network, the bearer node may periodically perform information exchange with the base station to update the saved neighborhood information, or the base station may send the neighborhood information of the base station to the bearer node in an event triggered manner according to changes of a neighborhood relationship of the base station. The base station needs to save neighborhood information between base stations, where the neighborhood information may be determined on the basis of network planning and deployment, and the determined neighborhood information may be configured and saved on each base station manually, or the neighborhood information of the base station may be discovered dynamically by the base station through an automatic neighbor discovery protocol, and then saved and maintained on the base station.

After obtaining the neighborhood information of the base stations, the bearer node may save and maintain the neighborhood information.

Every bearer node of the bearer network reports the base station identity information and neighborhood information of the base stations maintained by itself to the network management device, so that the network management device may save and maintain a table of base station identity information and neighboring base station information of all base stations connected to the bearer network.

As the network management device has the table of base station identity information and neighboring base station information of all base stations connected to the bearer network, the bearer network may accordingly establish neighboring base station connections, that is, X2 connections, and then may dynamically manage the neighboring base station connections according to changes of a neighborhood relationship of the base stations (reference can be made to the foregoing embodiments for details, and the details will not be described herein again), so as to achieve dynamic establishment and maintenance of the neighboring base station connections, thereby improving the networking efficiency and reducing the operation and maintenance cost.

Figure 4:
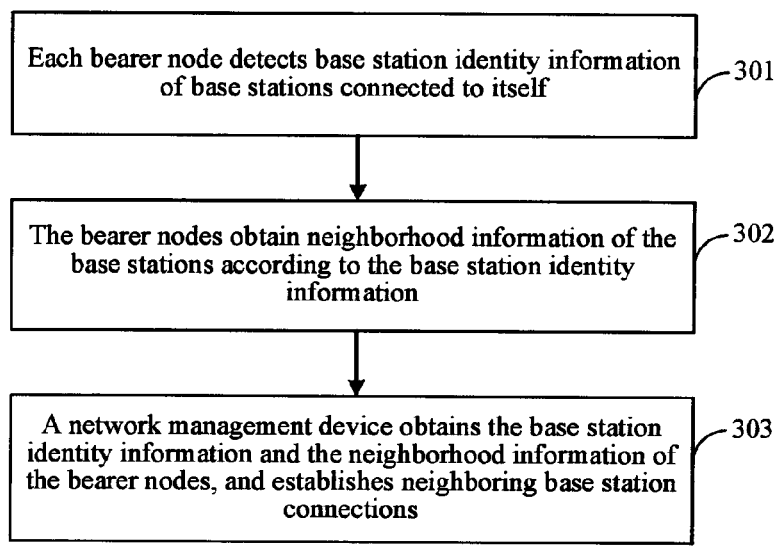
FIG. 4 is a flow chart of a method according to Embodiment 3 of the present invention.

As shown in FIG. 4, a specific process may be as follows:

301: Each bearer node detects base station identity information of a base station connected to itself, for example, an ID or IP of the base station, identifies the connected base station, and maintains a base station connection table.

302: Each bearer node establishes a communication connection with a base station according to the base station connection table in step 301, and then performs information exchange with the base station through the established communication connection to obtain neighborhood information of the base station. Each bearer node may maintain a base station neighborhood relationship table according to the obtained neighborhood information of the base station.

303: A network management device obtains base station identity information and neighborhood information of each bearer node, and establishes a neighboring base station connection. A specific establishing manner may be determined according to policies of operators on the basis of the prior art.

For example, the network management device may receive the base station identity information and the neighborhood information of the base station that are actively reported by the bearer node, or may send a query message to the bearer node and then receive access information and the neighborhood information of the base station that are sent by the bearer node, and upon receiving the base station identity information and the neighborhood information of the base station, the network management device can learn bearer connection demands of neighboring base stations in a bearer network, and therefore can create connections for neighboring base stations in the bearer network.

As can be known from the above that, in this embodiment, the bearer node in the bearer network may obtain the base station identity information of the base stations and the neighborhood information of the base stations, and report the obtained base station identity information and neighborhood information of the base stations to the network management device, and the network management device automatically establish neighboring base station connections according to the base station identity information and the neighborhood information of the base stations, so that a large amount of configuration and maintenance work for the network management device in the prior art is greatly reduced, for example, in scenarios such as power off of base stations and relocation or capacity expansion of base stations, new neighboring base station connections can be established without requiring much labor, material or time to reconfigure configuration data. Therefore, the solution provided in the embodiment of the present invention can improve network operation and maintenance efficiency, reduce operation and maintenance complexity and reduce the operation and maintenance cost.

Meanwhile, as connections are created by a network automatically, the bearer network may preset a policy corresponding to network resources according to a condition of network resource utilization, and then create links according to the preset policy, so that a utilization ratio of network resources can be sufficiently improved.

Further, as connections are created by the network automatically, problems in the prior art such as communication network failure caused by delayed adjustment of configuration data as manual static configuration is required can be avoided when the network changes, so that the network service quality can be improved.

Embodiment 4

According to the method described in Embodiment 1, this embodiment further provides a detail illustration through an example.

In this embodiment, illustration is provided through an example that each bearer node initiates establishment of neighboring base station connections. Different from Embodiment 2, in this embodiment, every bearer node in the bearer network only needs to transfer and spread obtained access information in a bearer network, and does not need to transfer and spread neighborhood information of base stations in the bearer network. Each bearer node initiates a connection establishment request for establishing a connection for neighboring base station according to the neighborhood information of the base stations obtained by itself. Each bearer node has access information of all base stations, and therefore may determine between which bearer nodes neighboring base station connections should be established, and each bearer node may complete establishment of neighboring base station connections simply according to the neighborhood information of the base stations and the access information in the bearer network that are obtained by itself.

A communication protocol interface may be added between a bearer node and a base station, so that the bearer node may learn base station identity information of the base station connected to the bearer node, for example, an ID or an IP address of the base station, and subsequently may also obtain neighborhood information of the base station through the communication protocol interface; for a specific manner of obtaining the base station identity information, different solutions may be adopted according to different network technologies and connection manners, and the base station identity information may not necessarily be obtained through the added communication protocol interface, and for example, may be obtained by intercepting or monitoring an IP address of the access base station.

After obtaining the base station identity information, the bearer node may send the obtained base station identity information to other bearer nodes in the bearer network, receive base station identity information sent from the other bearer nodes, save and maintain a connection relation between a base station and a bearer node according to the base station identity information obtained by itself and the base station identity information sent from the other bearer nodes so as to obtain a table of base station access of an entire network, obtain neighborhood information of the base station according to the base station identity information obtained by itself, and save the neighborhood information, for example, may save and maintain a base station neighborhood relationship table; then, the bearer node may initiate establishment of neighboring base station connections, that is, X2 connections, according to the table of base station access of the entire network and the base station neighborhood relationship table that are saved by itself. Likewise, other bearer nodes in the bearer network also perform the same operations. In this way, connections of neighboring base stations in the entire network may be established. The specific implementation is similar to the foregoing embodiments, and the details will not be described herein again.

To adapt to dynamic changes of the network, the neighboring base station connections may further be dynamically managed according to changes of a neighborhood relationship of the base stations (reference can be made to the foregoing embodiments for details, and the details will not be described herein again), so as to achieve dynamic establishment and maintenance of the neighboring base station connections, thereby improving networking efficiency and reducing operation and maintenance cost.

As can be known from the above that, in this embodiment, the bearer node in the bearer network may obtain access information of the base stations and neighborhood information of the base stations, and automatically establish neighboring base station connections according to the obtained access information and neighborhood information of the base stations, so that a large amount of configuration and maintenance work for the network management device in the prior art is greatly reduced, for example, in scenarios such as power off of base stations and relocation or capacity expansion of base stations, new neighboring base station connections can be established without requiring much labor, material or time to reconfigure configuration data. Therefore, the solution provided in the embodiment of the present invention can improve network operation and maintenance efficiency, reduce operation and maintenance complexity and reduce operation and maintenance cost.

Meanwhile, as connections are created by the network automatically, the bearer network may preset a policy corresponding to network resources according to a condition of network resource utilization, and then create links according to the preset policy, so that a utilization ratio of network resources can be sufficiently improved.

Further, as connections are created by the network automatically, problems in the prior art such as communication network failure caused by delayed adjustment of configuration data as manual static configuration is required can be avoided when the network changes, so that the network service quality can be improved.

Embodiment 5

Figure 5:
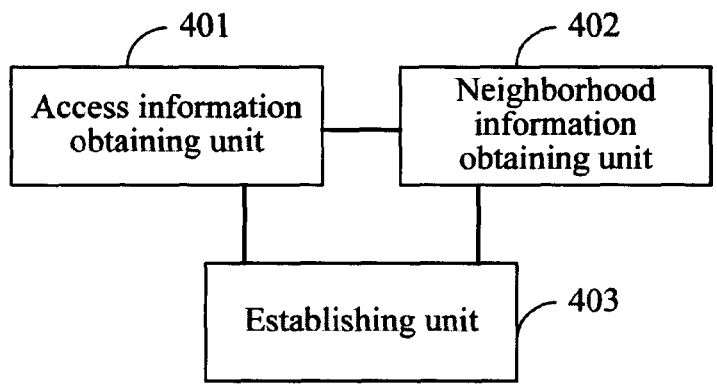
FIG. 5 is a schematic structural diagram of a device for establishing neighboring base station connections according to an embodiment of the present invention.
Figure 6:
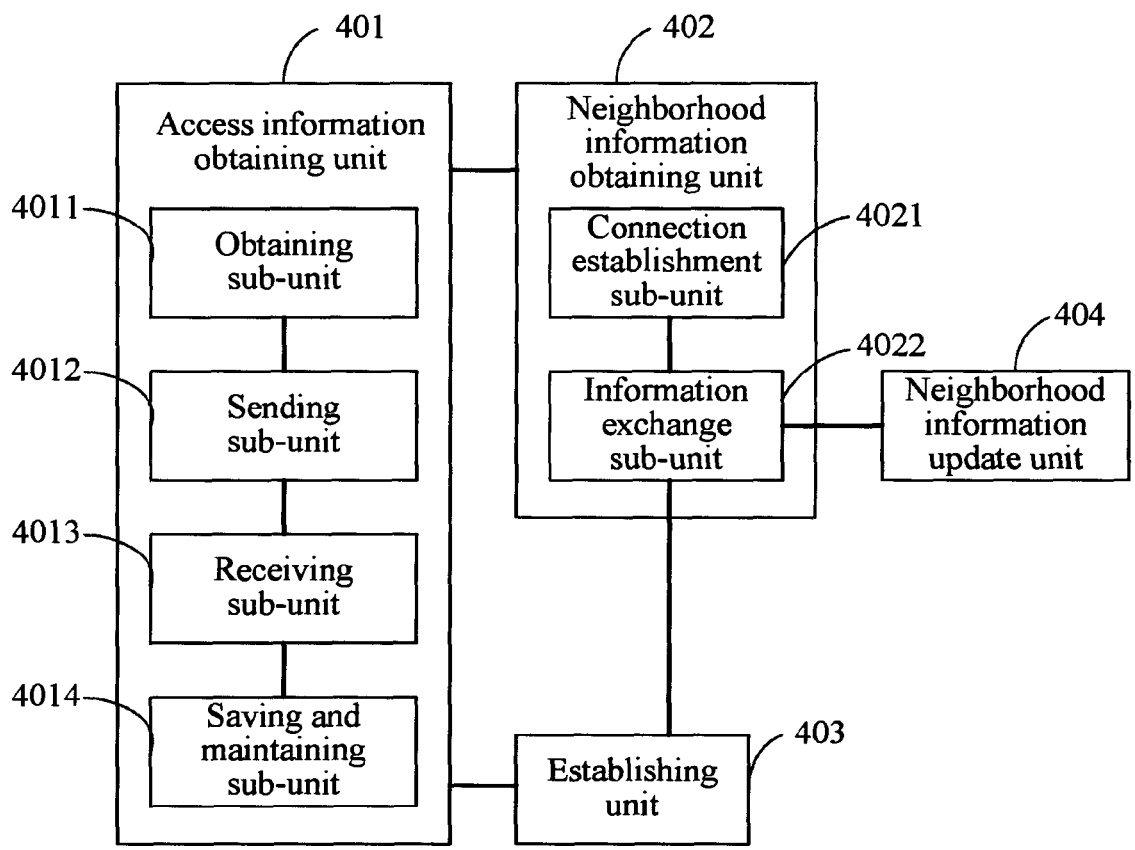
FIG. 6 is another schematic structural diagram of a device for establishing neighboring base station connections according to an embodiment of the present invention.

To better implement the above method, an embodiment of the present invention further correspondingly provides a device for establishing neighboring base station connections, serving as a bearer node in a bearer network. As shown in FIG. 5 and FIG. 6, the device for establishing neighboring base station connections includes an access information obtaining unit 401, a neighborhood information obtaining unit 402 and an establishing unit 403.

The access information obtaining unit 401 is configured to obtain access information of a base station on a bearer network.

The neighborhood information obtaining unit 402 is configured to obtain neighborhood information of the base station according to the access information obtained by the access information obtaining unit 401.

The establishing unit 403 is configured to establish a neighboring base station connection according to the access information obtained by the access information obtaining unit 401 and the neighborhood information obtained by the neighborhood information obtaining unit 402.

Here, the access information may specifically be a connection relation between a base station and a bearer node, and accordingly, as shown in FIG. 5, the access information obtaining unit 401 may include an obtaining sub-unit 4011, a sending sub-unit 4012, a receiving sub-unit 4013 and a saving and maintaining sub-unit 4014.

The obtaining sub-unit 4011 is configured to obtain base station identity information of a base station connected to the device for establishing neighboring base station connections;

for example, an ID of the base station or an IP address of the base station; for a specific obtaining manner, different solutions may be adopted according to different network technologies and connection manners, for example, an interception or monitoring manner may be adopted.

The sending sub-unit 4012 is configured to send the base station identity information obtained by the obtaining sub-unit 4011 to other bearer nodes on the bearer network.

The receiving sub-unit 4013 is configured to receive base station identity information sent by other bearer nodes on the bearer network.

The saving and maintaining sub-unit 4014 is configured to save and maintain a connection relation between a base station and a bearer node according to the base station identity information obtained by the obtaining sub-unit 4011 and the base station identity information received by the receiving sub-unit 4013.

As shown in FIG. 6, the neighborhood information obtaining unit 402 may include a connection establishment sub-unit 4021 and an information exchange sub-unit 4022.

The connection establishment sub-unit 4021 is configured to establish a communication connection with the base station according to the access information obtained by the access information obtaining unit 401; and specifically may establish the communication connection with the base station according to the access information saved and maintained by the saving and maintaining sub-unit 4014.

The information exchange sub-unit 4022 is configured to perform information exchange with the base station through the communication connection established by the connection establishment sub-unit 4021 to obtain the neighborhood information of the base station.

To adapt to dynamic changes of a base station network, the device for establishing neighboring base station connections may periodically perform information exchange with the base station to update the saved neighborhood information, or the base station may send the neighborhood information of the base station to the device for establishing neighboring base station connections in an event triggered manner according to changes of a neighborhood relationship of the base station. Therefore, as shown in FIG. 6, the device for establishing neighboring base station connections may further include a neighborhood information update unit 404.

The neighborhood information update unit 404 is configured to update the neighborhood information of the base station; and specifically may update the neighborhood information of the base station obtained by the information exchange sub-unit 4022, that is, the neighborhood information update unit 404 is specifically configured to periodically perform information exchange with the base station to update the saved neighborhood information, or receive the neighborhood information of the base station sent by the base station when the neighborhood relationship of the base station changes.

The establishing unit 403 is further configured to establish a neighboring base station connection according to the access information obtained by the access information obtaining unit 401 and the neighborhood information of the base station updated by the neighborhood information update unit 404, and specifically may establish the neighboring base station connection according to the access information saved and maintained by the saving and maintaining sub-unit 4014 and the neighborhood information of the base station in the information exchange sub-unit 4022 (at this time, the neighborhood information of the base station in the information exchange sub-unit 4022 has been updated by the neighborhood information update unit 404).

Here, the establishing unit 403 is specifically configured to actively report the access information obtained by the access information obtaining unit 401 and the neighborhood information obtained by the neighborhood information obtaining unit 402 to a network management device, so that the network management device establishes a neighboring base station connection according to the received access information and neighborhood information; or after receiving a query from a network management device, send the access information obtained by the access information obtaining unit 401 and the neighborhood information obtained by the neighborhood information obtaining unit 402 to the network management device, so that the network management device establishes a neighboring base station connection according to the received access information and neighborhood information.

Alternatively, the establishing unit 403 is specifically configured to initiate a connection establishment request for establishing a connection for neighboring base station to the bearer network according to the access information obtained by the access information obtaining unit 401 and the neighborhood information obtained by the neighborhood information obtaining unit 402, so that the bearer network establishes a neighboring base station connection according to the received connection establishment request.

For the specific implementation of the above units, reference can be made to the foregoing embodiments, and the details will not be described herein again.

As can be known from the above that, in the device for establishing neighboring base station connections provided in this embodiment, the access information obtaining unit 401 may obtain access information of all base stations on the bearer network dynamically, the neighborhood information obtaining unit 402 obtains neighborhood information of the base stations according to the access information, and then the establishing unit 403 establishes neighboring base station connections according to the access information and the neighborhood information, which does not require much labor, material or time to perform static configuration of neighboring base station connections, so that networking efficiency can be improved, operation and maintenance complexity can be reduced, and operation and maintenance cost can be reduced.

Embodiment 6

Correspondingly, an embodiment of the present invention further provides a system for establishing neighboring base station connections, where the system for establishing neighboring base station connections includes any device for establishing neighboring base station connections provided in the embodiments of the present invention and a base station.

The device for establishing neighboring base station connections is mainly configured to obtain access information of a base station on a bearer network, obtain neighborhood information of the base station according to the obtained access information, and then establish a neighboring base station connection according to the obtained access information and neighborhood information. Reference can be made to Embodiment 3 for details, and the details will not be described herein again.

The base station is configured to provide neighborhood information of the base station to the device for establishing neighboring base station connections. Neighborhood information between base stations is required to be saved on the base station, where the neighborhood information may be determined on the basis of network planning and deployment, and the determined neighborhood information may be configured and saved on each base station manually, or the neighborhood information of the base station may be discovered dynamically by the base station through an automatic neighbor discovery protocol, and then saved and maintained on the base station. Reference can be made to the prior art for details, and the details will not be described herein again.

Serving as a bearer node in the bearer network, the device for establishing neighboring base station connections is a bridge for connection between a base station and a core network, that is, all base stations are connected to bearer nodes in the bearer network, and then the base stations are connected to the core network through the bearer network.

In specific implementations, a communication protocol interface may be added between the device for establishing neighboring base station connections and the base station, so that the device for establishing neighboring base station connections may learn the base station identity information of the base station connected to the device. After obtaining the base station identity information of the base station connected to the device, the device for establishing neighboring base station connections may transfer and spread the obtained base station identity information in the bearer network to devices for establishing neighboring base station connections serving as other bearer nodes, and meanwhile receive base station identity information transferred from the devices for establishing neighboring base station connections serving as other bearer nodes, and save and maintain the base station identity information. Based on this, the bearer node may learn base station identity information of all base stations connected to the bearer network, that is, the device for establishing neighboring base station connections may obtain access information of all base stations on the bearer network. After obtaining the access information of all base stations on the bearer network, the device for establishing neighboring base station connections may obtain neighborhood information of the base stations according to the access information, and then may transfer and spread the neighborhood information in the bearer network, and meanwhile receive neighborhood information of base stations transferred from the devices for establishing neighboring base station connections serving as other bearer nodes, and save and maintain the neighborhood information. Based on this, all bearer nodes in the bearer network (that is, the devices for establishing neighboring base station connections according to this embodiment) each save a table of neighboring base station information of all base stations connected to the bearer network. Accordingly, the bearer network may adopt a corresponding control protocol in the prior art to establish neighboring base station connections, and then may dynamically manage the neighboring base station connections according to changes of a neighborhood relationship of the base stations, thereby achieving dynamic establishment and maintenance of the neighboring base station connections. Each bearer node may not need to save a connection condition of an entire network, for example, the access information and the neighborhood information are reported to a network management device, the network management device saves and maintains a table of neighboring base station information of all base stations connected to the bearer network, and then the network management device adopts a corresponding control protocol in the prior art to establish neighboring base station connections on the basis of the table of neighboring base station information of all base stations connected to the bearer network. Reference can be made to the foregoing embodiments for details, and the details will not be described herein again.

For the specific implementation of the system for establishing neighboring base station connections, reference can be made to the foregoing embodiments, and the details will not be described herein again.

Based on the above, the system for establishing neighboring base station connections according to the embodiment of the present invention may automatically obtain access information of base stations and neighborhood information of base stations, and automatically establish neighboring base station connections according to the obtained access information and neighborhood information of the base stations, so that a large amount of configuration and maintenance work for the network management device in the prior art is greatly reduced, which can improve network operation and maintenance efficiency, reduce operation and maintenance complexity and reduce operation and maintenance cost. Meanwhile, as connections are created by the network automatically, the bearer network may preset a policy corresponding to network resources according to a condition of network resource utilization, and then create links according to the preset policy, so that a utilization ratio of network resources can be sufficiently improved. Further, as connections are created by the network automatically, problems in the prior art such as communication network failure caused by delayed adjustment of configuration data as manual static configuration is required can be avoided when the network changes, so that the network service quality can be improved.

Persons of ordinary skill in the art should understand that, all of or a part of the steps in the method according to the above embodiments may be implemented by a program instructing relevant hardware. The program may be stored in a computer readable storage medium. The storage medium may be a ROM/RAM, a magnetic disk or an optical disk.

The foregoing descriptions are merely exemplary embodiments of the present invention, but are not intended to limit the protection scope of the present invention. Any modification, equivalent replacement, or improvement made within the spirit and principle of the present invention should fall within the protection scope of the present invention.

What is claimed is:

1. A method for establishing X2 connections, the method is implemented by hardware, comprising:

obtaining, by a first bearer node device, a first Internet Protocol (IP) address of a first base station, and maintaining a connection relation between the first base station and the first bearer node device according to the obtained first IP address, wherein the first base station connects to the first bearer node device, wherein the first bearer node device is not a base station, and is in a bearer network which excludes any base station;

establishing, by the first bearer node device, according to the connection relation between the first base station and the first bearer node device, a communication connection between the first base station and the first bearer node device;

performing, by the first bearer node device, information exchange with the first base station through the communication connection in order to obtain a neighborhood relationship different from the connection relation of the first base station, wherein the neighborhood relationship different from the connection relation of the first base station comprises a second IP address of a second base station, the second base station is a neighboring base station of the first base station, and is connected to a second bearer node device in the same bearer network;

saving and maintaining, by the first bearer node device, the neighborhood relationship different from the connection relation of the first base station; and establishing, by the first bearer node device or a network management device, an X2 connection both in the bearer network and between the first base station and the second base station according to the connection relation between the first base station and the first bearer node device, and according to the neighborhood relationship different from the connection relation of the first base station.

2. The method according to claim 1, wherein after the obtaining the first IP address of the first base station, the method further comprises:

sending, by the first bearer node device, the obtained first IP address to the second bearer nodes on the same bearer network;

receiving, by the first bearer node device, the second IP address sent by the second bearer nodes on the same bearer network; and saving and maintaining, by the first bearer node device, connection relation between the first and the second base stations and the second bearer nodes devices according to the received IP address sent by the other bearer nodes devices.

3. The method according to claim 2, wherein the establishing, by the network management device, the X2 connection in the first bearer network and between the first base station and the second base station according to the connection relation between the first base station and the first bearer node device and the neighborhood relationship different from the connection relation of the first base station comprises:

reporting, by the first bearer node device, the connection relation between the first base station and the first bearer node device and the neighborhood relationship different from the connection relation of the first base station to the network management device, so that the network management device establishes the X2 connection according to the connection relation between the first base station and the first bearer node device and the neighborhood relationship different from the connection relation of the first base station.

4. The method according to claim 2, wherein the establishing, by the network management device, the X2 connection in the bearer network and between the first base station and the second base station according to the connection relation between the first base station and the first bearer node device and the neighborhood relationship different from the connection relation of the first base station comprises:

initiating, by the first bearer node device, a connection establishment request for establishing the X2 connection to the bearer network according to the connection relation between the first base station and the first bearer node device and the neighborhood information, so that the bearer network establishes the X2 connection according to the connection establishment request.

5. The method according to claim 1, wherein the establishing, by the network management device, the X2 connection in the bearer network and between the first base station and the second base station according to the connection relation between the first base station and the bearer node device and the neighborhood relationship different from the connection relation of the first base station comprises:

reporting, by the first bearer node device, the connection relation between the first base station and the first bearer node device and the neighborhood relationship different from the connection relation of the first base station to the network management device, so that the network management device establishes the X2 connection according to the connection relation between the first base station and the first bearer node device and the neighborhood relationship different from the connection relation of the first base station.

6. The method according to claim 1, wherein the establishing, by the network management device, the X2 connection in the bearer network and between the first base station and the second base station according to the connection relation between the first base station and the first bearer node device and the neighborhood relationship different from the connection relation of the first base station comprises:

initiating, by the first bearer node device, a connection establishment request for establishing the X2 connection to the bearer network according to the connection relation between the first base station and the first bearer node device and the neighborhood relationship different from the connection relation of the first base station, so that the bearer network establishes the X2 connection according to the connection establishment request.

7. The method according to claim 1, wherein after obtaining the neighborhood relationship different from the connection relation of the first base station, the method further comprises:

transferring and spreading the neighborhood relationship of the first base station in the bearer network;

receiving neighborhood relationship of other base stations transferred from other bearer node devices in the bearer network; and saving and maintaining the received neighborhood information.

8. A device, serving as a first bearer node device which is not a base station, and is within a bearer network which excludes any base station, for establishing X2 connections, comprising:

an obtaining unit, configured to obtain a first Internet Protocol (IP) address of a first base station, and maintaining a connection relation between the first base station and the first bearer node device according to the obtained first IP address, wherein the first base station connects to the first bearer node;

a neighborhood information obtaining unit, configured to establish, according to the connection relation between the first base station and the first bearer node device, a communication connection between the first base station and the first bearer node device, and perform information exchange with the first base station through the communication connection in order to obtain a neighborhood relationship different from the connection relation of the first base station, wherein the neighborhood relationship different from the connection relation of the first base station comprises a second IP address of a second base station, the second base station is a neighboring base station of the first base station, and is connected to a second bearer node device in the same bearer network; and an establishing unit, configured to establish an X2 connection in the bearer network and between the first base station and the second base station according to the connection relation between the first base station and the first bearer node device obtained by the obtaining unit and the neighborhood relationship different from the connection relation of the first base station obtained by the neighborhood information obtaining unit.

9. The device for establishing neighboring base station connections according to claim 8, wherein the obtaining unit comprises:
- a sending sub-unit, configured to send the first IP address to other bearer node devices on the same bearer network;
- a receiving sub-unit, configured to receive a second IP address sent by the second bearer nodes on the same bearer network; and
- a saving and maintaining sub-unit, configured to save and maintain connection relation between base stations and the other bearer nodes devices according to the IP addresses received by the receiving sub-unit.

10. The device for establishing neighboring base station connections according to claim 8, wherein:
- the establishing unit is configured to report the connection relation between the first base station and the first bearer node device obtained by the obtaining unit and the neighborhood relationship different from the connection relation of the first base station obtained by the neighborhood information obtaining unit to the network management device, so that the network management device establishes the X2 connection according to the connection relation between the first base station and the first bearer node device and the neighborhood relationship different from the connection relation of the first base station; or
- the establishing unit is configured to initiate a connection establishment request for establishing the X2 connection to the bearer network according to the connection relation between the first base station and the first bearer node device obtained by the access information obtaining unit and the neighborhood information obtained by the neighborhood relationship different from the connection relation of the first base station obtaining unit, so that the bearer network establishes the X2 connection according to the connection establishment request.

11. A system for establishing neighboring base station connections, comprising the device for establishing neighboring base station connections according to claim 8 and the first base station;
- wherein the first base station is configured to provide the neighborhood relationship different from the connection relation of the first base station to the first bearer node device for establishing neighboring base station connections.

* * * * *